Patented Oct. 12, 1937

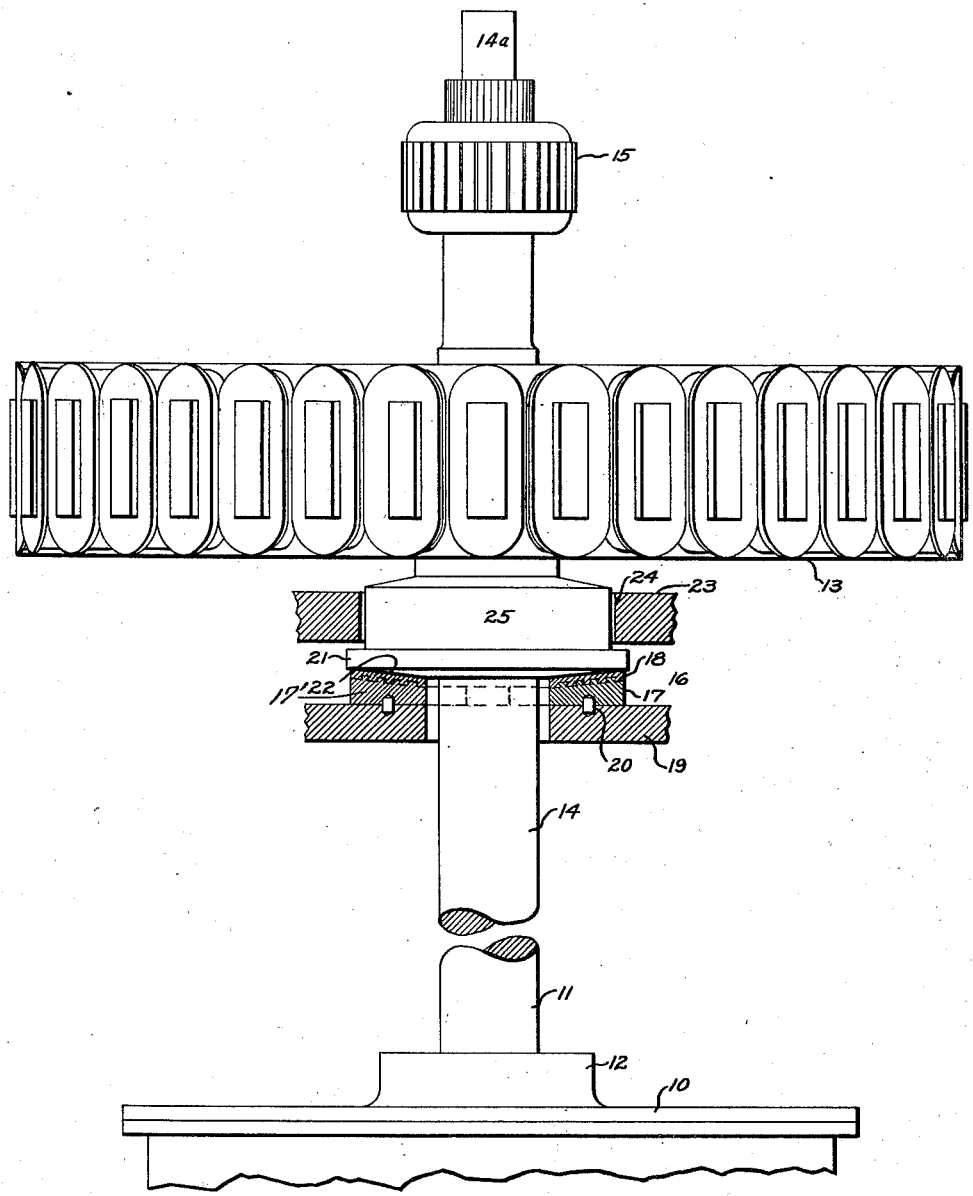

2,095,844

UNITED STATES PATENT OFFICE 2,095,844

VERTICAL SHAFT TURBO GENERATOR

Ernest L. Thearle, Schenectady, N. Y., assignor to General Electric Company, a corporation of New York Application July 11, 1935, Serial No. 30,850

2 Claims. (Cl. 308—142)

The present invention relates to vertical shaft turbo-generators, in particular hydraulic turbines, having vertical shafts for driving a generator which is disposed above the turbine and has a shaft arranged in alinement with that of the turbine rotor. In certain cases, especially where the generator is supported solely by bearing means disposed below it, difficulty has been experienced due to vibrations of the generator shaft known as "skating".

The general object of my invention is to provide an improved arrangement of turbo-generators of the type specified above whereby vibrations or undesirable gyratory motions of the generator shaft are eliminated.

For a consideration of what I believe to be novel and my invention, attention is directed to the following description and the claims appended thereto in connection with the accompanying drawing.

The single figure of the drawing represents a vertical shaft turbo-generator embodying my invention.

The arrangement includes a water wheel operated turbine 10 having a vertical shaft 11 suitably supported by means including a guide bearing 12. A generator having a rotor 13 with a vertical shaft 14 is disposed at a considerable distance vertically above the turbine 10 and its shaft 14 is driven from the shaft 11 by any suitable well known connection, not shown. Connected to the upper end of the shaft 14 above the rotor 13 is an exciter 15. The upper end 14a of the shaft 14 rotates freely, that is, is not supported by any bearing means. The means for normally supporting the generator rotor 13 consists of a single thrust bearing 16 arranged below the rotor 13. This thrust bearing, in accordance with my invention, includes a plurality of segmental bearing members 17, 17' having bearing surfaces 18 formed of suitable bearing metal and being held on a support 19 by pivot pins 20. The bearing surface is slightly conical. The angle of the cone may be of the order of a few degrees. An annular thrust bearing collar 21 formed on the shaft 14 has a lower conically shaped surface 22 in cooperative relation with the surface of the thrust bearing. The provision of a slightly conical thrust bearing is an important feature of my invention in that it causes a definite axis of rotation of the generator shaft 14 being established during operation or, from another viewpoint, it prevents the axis of the generator shaft 14 from shifting or assuming different angular positions during operation. It is noted that the shaft 14 is usually of considerable length whereby a slight angular position with respect to the vertical axis of rotation causes considerable deviation at the upper free end 14a which deviation might result in failure of the exciter 15. As a safety means, I provide intermediate the thrust bearing and the rotor 13 a safety guide bearing 23 having a cylindrical bearing surface 24 concentrically spaced from a collar 25 formed on the shaft. The clearance defined between the safety guide bearing and the collar 25 is larger than in ordinary guide bearings.

With my invention I have accomplished an improved bearing support for generators driven by overhung type water wheels or like prime movers. In this type of machine the water wheel guide bearing usually is comparatively small in diameter, for instance, 30", whereas the generator guide bearing is more than twice that size, for instance 60" in diameter. Due to this large diameter and due to the effect of temperature changes, it is necessary to leave rather large bearing clearances in the generator guide bearing. A definite axis of rotation of such system is accomplished in accordance with my invention by the provision of a single slightly conically shaped thrust bearing below the rotor of the generator.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. The combination with a water turbine having a vertical shaft, a generator disposed at a considerable distance above the turbine and having a shaft with a collar driven from and in alinement with the turbine shaft, of means for normally supporting the generator consisting of a single thrust bearing arranged below the generator and having a slightly conically shaped bearing surface in cooperative relation with the collar, and means circumferentially spaced from the collar for limiting movement of the generator shaft out of its vertical position.

2. The combination with a water turbine having a vertical shaft, a generator disposed above the turbine and having a shaft driven from and in alinement with the turbine shaft, of means for normally supporting the generator consisting of a single thrust bearing arranged below the generator and having a slightly conically shaped bearing surface, and a safety guide bearing above the thrust bearing having a cylindrical bearing surface of considerable diameter concentrically spaced from the shaft to define a clearance with the shaft, said clearance being of such size that contacting between the adjacent surfaces of the shaft and the guide bearing does not occur during normal operating conditions.

ERNEST L. THEARLE.